M. H. SMITH.
COMBINED BUFFER NIPPLE AND FILTER FOR WATER FAUCETS.
APPLICATION FILED JULY 19, 1909.

981,702.

Patented Jan. 17, 1911.

WITNESSES:
H. E. Chase
N. C. Thomas

INVENTOR.
M. H. Smith
BY
Howard P. Denison
ATTORNEY.

UNITED STATES PATENT OFFICE.

MARY H. SMITH, OF SYRACUSE, NEW YORK.

COMBINED BUFFER-NIPPLE AND FILTER FOR WATER-FAUCETS.

981,702.

Specification of Letters Patent. Patented Jan. 17, 1911.

Application filed July 19, 1909. Serial No. 508,268.

*To all whom it may concern:*

Be it known that I, MARY H. SMITH, of Syracuse, in the county of Onondaga, in the State of New York, have invented new and useful Improvements in Combined Buffer-Nipples and Filters for Water-Faucets, of which the following, taken in connection with the accompanying drawings, is a full, clear, and exact description.

This invention relates to a combined buffer nipple and filter for water faucets, and comprises essentially an elastic sleeve (preferably of soft rubber) adapted to fit snugly upon the nozzle of the faucet, and provided with a filtering screen of wire gauze or similar material, the same to be secured in place in any convenient way, as by an annular recess or slit in proximity to its lower end of said sleeve, but within the end of the nozzle, for the reception and retention of the filtering screen.

The object is to protect glass, china and earthenware dishes or other fragile receptacles from breakage by contact with the faucet, and at the same time to provide the buffer with a filtering screen which may be readily removed for cleansing and reinserted without liability of displacement by the water pressure.

Figure 1:
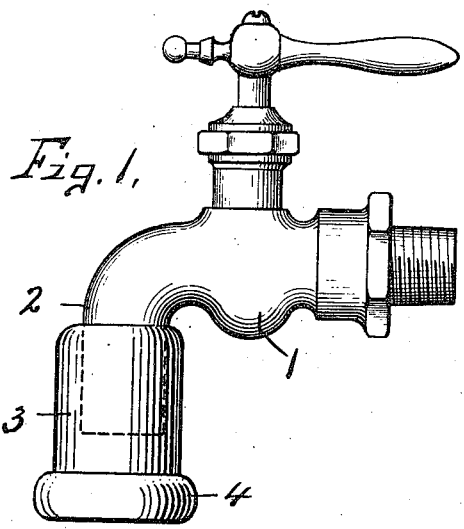
Figure 2:
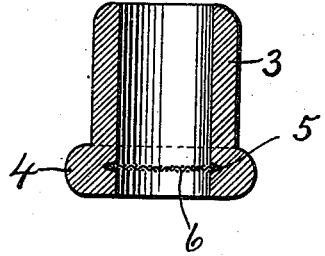
Figure 3:
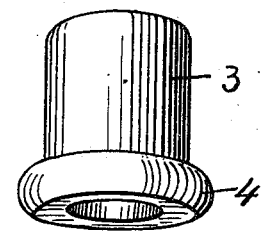
Figure 4:
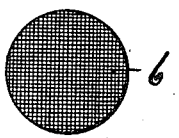

Other objects and uses will be brought out in the following description:

In the drawing—Figure 1 is an elevation of a water faucet showing my improved buffer and filtering device attached thereto. Fig. 2 is a sectional view of the detached buffer showing the filtering screen in operative position. Fig. 3 is a perspective view of the detached buffer, and Fig. 4 is a plan of the detached screen.

The faucet, as —1—, is provided with the usual nozzle —2— upon which is snugly fitted an elastic buffer nipple or sleeve —3— of soft rubber or other yielding material. The main body of the buffer is cylindrical, but terminates at its lower end in an annular enlargement or bead —4— for affording better protection and more effectively preventing the contact of dishes, such as glass cups and other fragile receptacles with the metal of the faucet when held under the nozzle of the faucet for the reception of water from the faucet. The opening through the rubber sleeve or buffer is of substantially the same diameter from end to end.

The lower end of the buffer having the bead —4— is provided with an inner annular slit —5— of greater diameter than the main opening for the reception and retention of a circular screen disk —6— of wire gauze or other suitable material which serves to filter the water passing therethrough, and owing to the pliability or flexibility of the rubber in which it is seated, may be readily removed and cleansed and reinserted when necessary.

What I claim is—

A nipple for water faucets comprising a hollow cylindrical body of resilient material adapted to snugly fit upon the nozzle of a faucet and having an enlarged outer end to provide a peripheral bead thereat, said enlarged portion of said body having its inner face approximately centrally thereof provided with an annular slit, the inner diameter of said body being the same throughout, and a filtering screen having its edges positioned in said slit and extending across the outer terminus of said body-portion.

In witness whereof I have hereunto set my hand this 12th day of July, 1909.

MARY H. SMITH.

Witnesses:
H. E. CHASE,
J. M. HOES.